United States Patent Office 3,551,526

Patented Dec. 29, 1970

1

3,551,526

CHLORINATED ETHYLENE POLYMER MOLDING MATERIALS

Hans-Georg Trieschmann, Hambach, and Gerhard Zeitler, Hessheim, Germany, assignors to Badische Anilin- & Soda-Fabrik Aktiengesellschaft, Ludwigshafen (Rhine), Germany No Drawing. Filed Aug. 21, 1968, Ser. No. 754,467
Claims priority, application Germany, Aug. 26, 1967, 1,669,718
Int. Cl. C08f *29/12, 29/22*
U.S. Cl. 260—897 3 Claims

ABSTRACT OF THE DISCLOSURE

Molding materials containing mixtures of chlorinated low-density polyethylene with chlorinated high-density polyethylene.

This invention relates to molding materials which contain mixtures of chlorinated ethylene polymers.

Molding materials based on chlorinated ethylene polymers are known. Thus for example low-density and high-density polymers may be chlorinated by treatment with chlorine in the gas phase or in suspension so that chlorinated polymers are obtained which are suitable for producing molding material for thermoplastic processing. The properties of the chlorinated polymers are substantially dependent on the type of polymers (low-density or high-density polyethylene), on the molecular weight and on the chlorine content so that it is possible to prepare molding materials for different applications. Thus for example it is found that at the same chlorine content moldings with better strength properties are obtained from chlorinated high-density polyethylene than from chlorinated low-density polyethylene. On the other hand the melt viscosity of chlorinated low-density polyethylene is more favorable for processing than that of chlorinated high-density polyethylene.

It is the object of this invention to provide chlorinated polyethylene molding materials which have both good strength properties and favorable flow properties.

We have found that molding materials based on chlorinated polyethylene have particularly favorable properties when they contain 10 to 90% by weight of chlorinated low-density polyethylene and 90 to 10% by weight of chlorinated high-density polyethylene, the percentages being with reference to the total content of chlorinated polyethylene.

It was to be expected that mixtures of chlorinated low-density and high-density polyethylene would have properties corresponding to the contents of the polymers contained in the mixtures. It has been found however that surprisingly the molding materials according to this invention have particularly favorable properties as regards flow and strength. The values ascertained with the molding material are in various properties higher than the sum of the values which can be measured with the individual components. Thus the molding materials according to this invention have particularly favorable flow properties during processing. The moldings prepared therefrom have particularly high strength.

The molding materials should contain 10 to 90%, preferably 40 to 60%, by weight (with reference to the total amount of chlorinated polyethylene) of chlorinated low-density polyethylene. Chlorinated low-density polyethylenes are defined as products which have been obtained by chlorinating low-density polyethylene in the molecular weight range of from 20,000 to 180,000 and having a density of from 0.900 to 0.938, particularly from 0.915 to 0.930, and which have a chlorine content of from 5 to 50% by weight with reference to the chlorinated polymer.

2

The content of chlorinated high-density polyethylene in the molding materials is from 90 to 10%, preferably 60 to 40%, by weight. The chlorinated polymers, which may contain from 10 to 30% by weight of chlorine with reference to the chlorinated polymer, are prepared by chlorination of high-density polyethylene in a molecular weight range of from 300,000 to 3,000,000 and having a density of from 0.930 to 0.960 particularly from 0.940 to 0.960.

The molding materials may be obtained either by mixing chlorinated low-density and high-density polymers or by chlorinating mixtures of low-density and high-density polymers. The second method can obviously only be used when the two components are to have the same chlorine content.

The molding materials according to this invention may contain further substances such as pigments, fillers, lubricants, plastinizers and substances having a synergistic effect on flame retardancy.

The molding materials are suitable in particular for the production of moldings by injection molding and for the extrusion of film, sheeting and boards. The molding materials may obviously also be processed by other molding techniques conventionally used in the processing of thermoplastics.

The molding materials have a good flow with a relatively wide range of plasticity. Moldings, for example film or sheeting, prepared from the molding materials are distinguished by a transparency which is better than that of the individual components.

The invention is illustrated by the following examples in which parts and percentages are by weight. The melt index (MI) is determined according to ASTM D1238–65 T. $MI_2$ is determined with an applied weight of 2 kg., $MI_{20}$ with an applied weight of 20 kg.

EXAMPLE 1

80 parts of chlorinated low-density polyethylene which has been prepared by chlorination of low-density polyethylene powder having a density of 0.918 and a molecular weight of 80,000 in the gas phase and which has a chlorine content of 25% and a melt viscosity $MI_2$ of 3, is mixed in a high speed mixer with 20 parts of a chlorinated high-density polyethylene which has been prepared by chlorination of high-density polyethylene powder having a density of 0.950 and a molecular weight of 300,000 in the gas phase, and which has a chlorine content of 25% and a melt viscosity $MI_{20}$ of 0.5. The mixture obtained is homogenized in an extruder (dimensions of screw: length/diameter=20/1) and extruded at a temperature of 160° C. in the form of strands which are converted by a face-cutting machine into granules. The molding material has a melt viscosity of $MI_2$=0.15.

When processing the mixture in an extruder the throughput is 940 parts per hour, a figure which is much higher than would have been expected from the melt viscosity. Chlorinated low-density polyethylene alone gives a throughput of 800 parts per hour, and chlorinated high-density polyethylene a throughput of 180 parts per hour. The molding material is processed by the blown-bubble extrusion method into film having a thickness of 5 microns, the inflation ratio being 1:20. Film having a smooth non-tacky surface and high transparency is obtained.

When the components of the molding material are processed individually, film is obtained whose surface is tacky and which has little transparency.

EXAMPLE 2

70 parts of chlorinated high-density polyethylene which has been prepared by chlorinating a high-density polyethylene having a molecular weight of 380,000 and a density of 0.954 in the gas phase and which has a chlorine content of 20% and a melt viscosity $MI_{20}$ of 1 is mixed in a high speed mixer with 30 parts of chlorinated low-density polyethylene which has been prepared by chlorinating low-density polyethylene having a molecular weight of 50,000 and a density of 0.920 in the gas phase and which has a chlorine content of 25% and a melt viscosity $MI_2$ of 3. The mixture obtained, when processed in an extruder (screw length/diameter=20/1), gives a throughput of 710 parts per hour; the chlorinated high-density polyethylene under the same conditions gives a throughput of 200 parts per hour and the chlorinated low-density polyethylene a throughput of 800 parts pe hour. Film prepared from the molding material has goo transparency.

EXAMPLE 3

Table 1 shows properties of molding materials of chlorinated low-density and high-density polyethylene compared with mixtures prepared therefrom. The following abbreviations are used: P=polyethylene; LD=low-density polyethylene; HD=high-density polyethylene; M=mixture of low-density and high-density polyethylenes; P*a*=parts; Cl=chlorine content in percent; T=throughput in the extruder in parts per hour; TR=tear resistance in kg./cm.²; E=elongation.

TABLE 1

| P | Pa | Cl | $MI_2$ | $MI_{20}$ | T | TR | E |
|---|---|---|---|---|---|---|---|
| LD | 80 | 25 | 3 | ------ | 800 | 240 | 680 |
| HD | 20 | 25 | ------ | 0.5 | 180 | 260 | 450 |
| M | 100 | 25 | 0.15 | ------ | 940 | 290 | 650 |
| LD | 50 | 25 | 3 | ------ | 800 | 240 | 680 |
| HD | 50 | 25 | ------ | 0.5 | 180 | 260 | 450 |
| M | 100 | 25 | 0.4 | ------ | 1,100 | 340 | 700 |
| LD | 50 | 25 | 3 | ------ | 800 | 240 | 680 |
| HD | 50 | 10 | ------ | 1 | 240 | 420 | 600 |
| M | 100 | 17.5 | 1.8 | ------ | 1,200 | 430 | 710 |
| LD | 30 | 25 | 3 | ------ | 800 | 240 | 680 |
| HD | 70 | 20 | ------ | 1 | 200 | 380 | 480 |
| M | 100 | 21.5 | 1.8 | ------ | 700 | 420 | 600 |

We claim:

1. Molding material consisting essentially of 10 to 90% by weight of chlorinated low-density polyethylene having a molecular weight of from 20,000 to 180,000 and having a density of from 0.900 to 0.938, said polyethylene having a chlorine content of from 5 to 50% by weight and 90 to 10% by weight of a chlorinated high-density polyethylene, said polyethylene having a molecular weight of from 300,000 to 3,000,000 and having a density of from 0.930 to 0.960, said polyethylene having a chlorine content of from 10 to 30% by weight.

2. Molding material as in claim 1 wherein 40 to 60% by weight of chlorinated low-density polyethylene is combined with 60 to 40% by weight of chlorinated high-density polyethylene.

3. Molding material as in claim 1 wherein the density of said low-density polyethylene is from 0.915 to 0.930 and the density of said high-density polyethylene is from 0.940 to 0.960.

References Cited

UNITED STATES PATENTS 3,355,519 11/1967 Müller et al. -------- 260—897
3,006,889 10/1961 Frey -------------- 260—45.5
2,268,162 12/1941 Myles et al. ---------- 260—94

FOREIGN PATENTS 1,009,772 11/1965 Great Britain -------- 260—897

OTHER REFERENCES

Canterino et al., Chlor. and Chlorsul. Polyolefins, J. of Applied Poly. Sci. (pub 1962), 20–23.

MURRAY TILLMAN, Primary Examiner

C. J. SECCURO, Assistant Examiner

U.S. Cl. X.R.

260—9, 909